United States Patent [19]

Cullen

[11] Patent Number: 5,425,220

[45] Date of Patent: * Jun. 20, 1995

[54] DENSITY CONTROL MEANS FOR AN AGRICULTURAL FEED BAGGING MACHINE

[75] Inventor: Steven R. Cullen, Astoria, Oreg.

[73] Assignee: Versa Corporation, Astoria, Oreg.

[ * ] Notice: The portion of the term of this patent subsequent to Mar. 29, 2011 has been disclaimed.

[21] Appl. No.: 200,760

[22] Filed: Feb. 23, 1994

Related U.S. Application Data

[63] Continuation-in-part of Ser. No. 3,540, Jan. 13, 1993, Pat. No. 5,297,377, which is a continuation-in-part of Ser. No. 912,873, Jul. 13, 1992.

[51] Int. Cl.6 .............................................. B65B 1/24
[52] U.S. Cl. ............................. 53/527; 53/255; 53/529; 53/567; 53/576; 100/100; 100/144; 141/74
[58] Field of Search ............... 141/71, 74, 114, 286, 141/317, 339; 100/65, 66, 67, 100, 144, 212; 53/255, 257, 260, 527, 529, 530, 551, 567, 576

[56] References Cited

U.S. PATENT DOCUMENTS

| | | | |
|---|---|---|---|
| 1,662,147 | 3/1928 | Farden | 141/339 |
| 2,174,228 | 9/1939 | Perkins | 141/339 |
| 2,250,910 | 7/1941 | Hiett | 141/339 |
| 3,621,775 | 11/1971 | Dedio et al. | 53/530 X |
| 3,791,593 | 2/1974 | Griffin | 239/667 |
| 3,815,323 | 6/1974 | Longo | 53/530 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,572,064 | 2/1986 | Burton | 100/212 X |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,788,901 | 12/1988 | Klinner et al. | 100/100 X |
| 4,792,031 | 12/1988 | Warner et al. | 141/339 X |
| 4,945,715 | 8/1990 | Brodrecht | 53/567 |
| 4,949,633 | 8/1990 | Johnson et al. | 100/65 |
| 5,009,062 | 4/1991 | Urich et al. | 100/100 X |
| 5,159,877 | 11/1992 | Inman et al. | 100/144 |
| 5,269,829 | 12/1993 | Meyer | 71/9 |
| 5,295,554 | 3/1994 | Cullen | 180/236 |
| 5,297,377 | 3/1994 | Cullen | 53/567 X |

Primary Examiner—John Sipos
Assistant Examiner—Daniel Moon
Attorney, Agent, or Firm—Zarley, McKee, Thomte Voorhees & Sease; Dennis L. Thomte

[57] ABSTRACT

An agricultural feed bagging machine comprising a pair of criss-crossed cables positioned in the tunnel of the machine. One of the cables is stationary while the other of the cables is adjustable so that the width of the adjustable cable may be varied to increase or decease the resistance of the cable to the feedstuffs passing through the tunnel.

15 Claims, 3 Drawing Sheets

DENSITY CONTROL MEANS FOR AN AGRICULTURAL FEED BAGGING MACHINE

CROSS-REFERENCE TO RELATED APPLICATION

This is a continuation-in-part application of Ser. No. 08/003,540 filed Jan. 13, 1993, U.S. Pat. No. 5,297,377 which is a continuation-in-part application of application Ser. No. 07/912,873 filed Jul. 13, 1992.

BACKGROUND OF THE INVENTION

1. Field of the Invention

This invention relates to an agricultural feed bagging machine and more particularly to an agricultural feed bagging machine having means associated therewith to control the density of the material being packed in the bag without the need for a backstop and cable brakes.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filing of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In applicant's co-pending application, Ser. No. 07/912,873, a bagging machine is described which has the capability of enabling the density of the silage material to be selectively controlled without the need of an elaborate braking system. Although the bagging machine of Ser. No. 07/912,873 does satisfactorily achieve all of its objectives, a more simple way of controlling the density of the bagged material was discovered and was the subject of the patent application, Ser. No. 08/1003,540. Although the density control means described in Ser. No. 08/003,540 did represent a significant advance in the art, it is believed that the instant invention likewise represents a significant advance over the prior art.

In the co-pending application, Ser. No. 08/003,540, a density control means was described which included a plurality of cables which were positioned in the flow of the silage material being bagged. In order to vary the density of the material in the machine of Ser. No. 08/003,540, more or less cables would be employed based on the material being packed. For example, corn silage flows easy and would require more cables while alfalfa packs hard and would use less cables. The need to have a convenient means for varying the density, by way of the density control cables, exists and the instant invention provides such a means.

SUMMARY OF THE INVENTION

An agricultural feed bagging machine is disclosed which comprises a wheeled frame having rearward and forward ends. A tunnel is provided on the wheeled frame and has an intake end for receiving silage material and an output end adapted to receive the mouth of an agricultural bag. A hopper is provided on the wheeled frame for receiving the silage material and is adapted to supply the same to a rotatable rotor which forces the silage into the tunnel means and into the bag. The density control means of this invention comprises a U-shaped cable positioned in the tunnel with the opposite ends of the cable being secured to the rod ends of hydraulic cylinders so that the width of the cable loop can be selectively narrowed or widened by actuating the hydraulic cylinders. The cable loop is preferably disposed at an angle to the horizontal and is preferably associated with a stationary cable which is also provided in the tunnel so that the two cables are crisscrossed. By criss-crossing the two cables, the resistance in packing the feedstuffs is approximately the same as four horizontal cables thereby making the machine easier to use and manufacture by having less cable and attachment requirements.

It is therefore a principal object of the invention to provide an improved agricultural feed bagging machine.

A further object of the invention is to provide an agricultural bagging machine having means at the output end of the tunnel for increasing the density of the silage material being forced through the tunnel into the bag.

A further object of the invention is to provide a density control means for an agricultural feed bagging machine including a pair of criss-crossed cables positioned in the tunnel with one of the cables being adjustable by means of hydraulic cylinders and the other cable being of the stationary type.

These and other objects of the invention will be apparent to those skilled in the art.

DESCRIPTION OF THE PREFERRED EMBODIMENT

Figure 1:
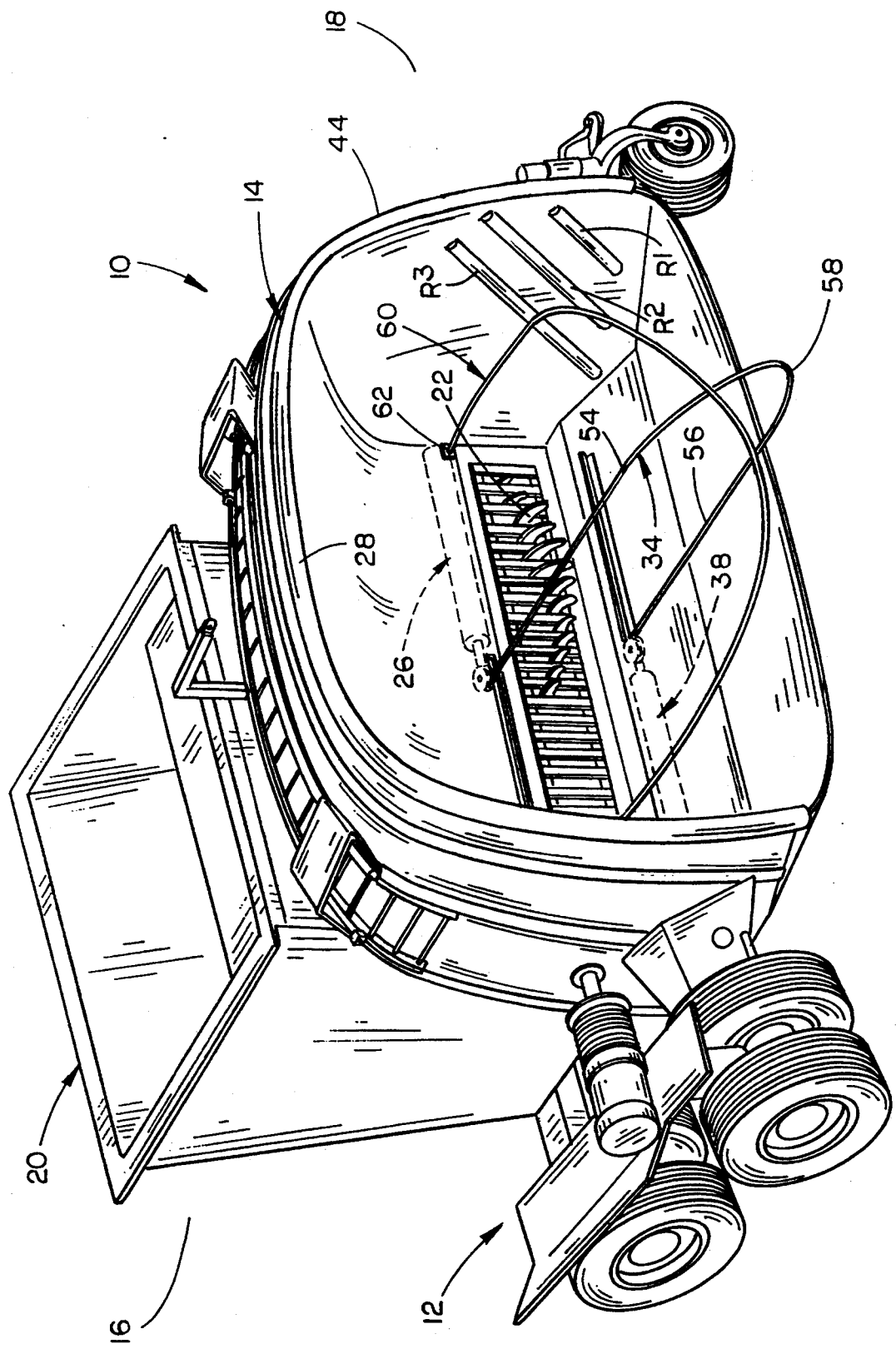
FIG. 1 is a rear perspective view of the agricultural bagging machine of this invention.

The numeral 10 refers to an agricultural bagging machine which is substantially conventional in design except for the new density control means positioned within the tunnel as will be described hereinafter.

Machine 10 includes a wheeled frame means 12 having a tunnel 14 mounted thereon upon which is normally positioned the open mouth of a conventional agricultural bag. Although the preferred embodiment includes a wheeled frame non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A rotatable rotor 22 of conventional design is located at the lower end of the hopper means 20 for forcing the materials to be bagged into the tunnel 14 and into the bag in conventional fashion.

Figure 2:
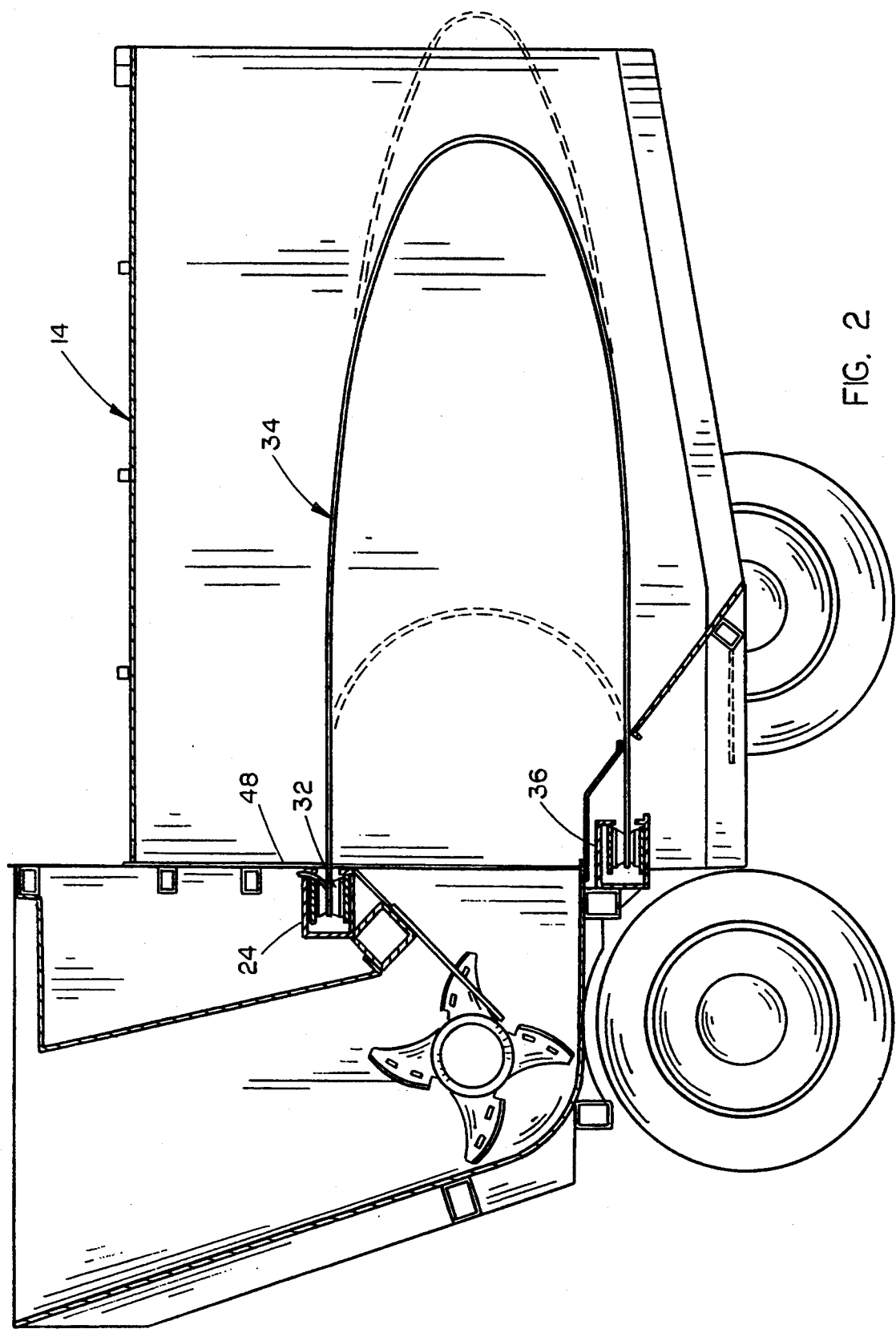
FIG. 2 is a longitudinal vertical sectional view of the bagging machine of this invention with the broken lines indicating various positions to which the cables may be moved.

Referring to FIG. 2, the numeral 24 refers to an elongated and horizontally disposed enclosure in which hydraulic cylinder 26 is positioned. Hydraulic cylinder 26 includes a convention cylinder 28 having rod 30 extending therefrom. The base end 32 of hydraulic cylinder 26 is fixed by any convenient means. Sheave 32 is provided on the outer end of rod 30 and is adapted to engage the cable 34 as will be described in more detail hereinafter.

The numeral 36 refers to an elongated and horizontally disposed enclosure in which is mounted hydraulic cylinder 38. Hydraulic cylinder 38 includes a cylinder 40 and a rod 42 extending therefrom. The base end 44 of hydraulic cylinder 38 is fixed by any convenient means. As seen in the drawings, a rotatable sheave 46 is mounted on the outer end of rod 42 and is adapted to engage the cable 34 as will be described in more detail hereinafter.

Figure 4:
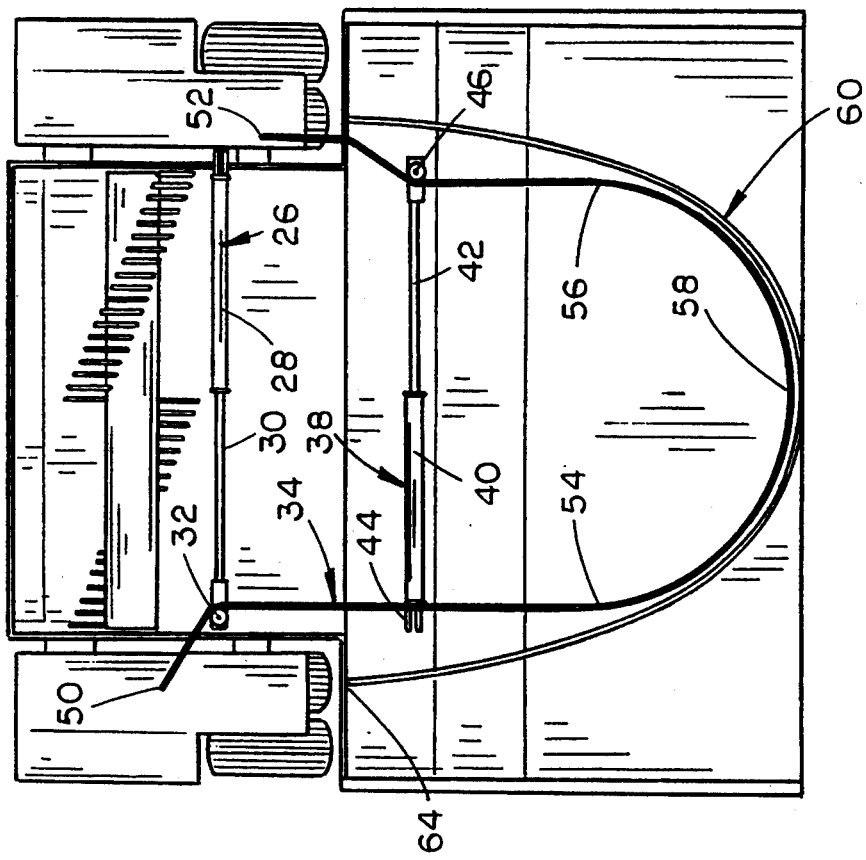
FIG. 4 a view similar to FIG. 3 with the density control means of this invention in a second position.
Figure 3:
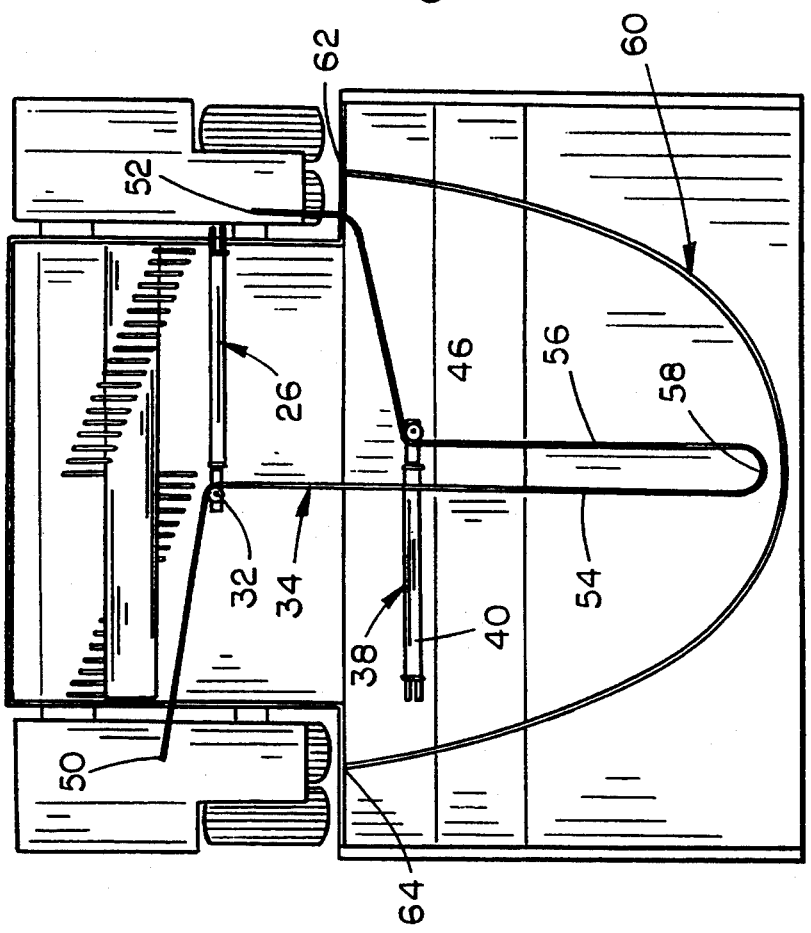
FIG. 3 is a top view of the density control means in a first position.

As seen in FIG. 2, enclosure 24 is located forwardly of the front wall 48 of the tunnel 14. As also seen in FIG. 2, enclosure 36 is located beneath the wall 48 of tunnel 14. As also seen in FIG. 2, enclosure 24 is located slightly forwardly of enclosure 36. FIGS. 3 and 4 exaggerate the relative positions of the hydraulic cylinders 26 and 38 for purposes of illustration.

Cable 34 has one end 50 extending outwardly of the hopper and is secured to any convenient anchor. Similarly, the other end 52 of cable 34 extends outwardly through an opening in tunnel 14 and is anchored to any convenient anchor position. For purposes of description, cable 34 will be described as including a first cable loop 54, a second cable loop 56 and a base portion 58. It can be seen in FIGS. 3 and 4 that the hydraulic cylinders 26 and 28 can be simultaneously operated so that the distance between the cable loops 54 and 56 may be varied to permit an adjustment of the density of the material being packed in the bag B. The hydraulic cylinders 26 and 38 are interconnected so that when hydraulic cylinder 26 extends, hydraulic cylinder 38 also extends. As seen in FIG. 3, the distance between the cable loops 54 and 56 is fairly small and will therefore offer little resistance to the material passing through the tunnel. When it is desired to increase the density of the material in the bag B, the hydraulic cylinders 26 and 38 are extended which increases the distance between cable loops 54 and 56. Although it is preferred that the cable 36 be angled with respect to the horizontal, as illustrated in the drawings, the cable 34 could dwell in a horizontal plane if desired.

It is also preferred, although not necessary in all situations, that a second stationary cable 60 be employed within the tunnel 14 and which is positioned therein so that the cables 60 and 34 are criss-crossed as illustrated in the drawings. One end 62 of cable 60 is anchored to the forward wall of tunnel 14 and extends rearwardly therefrom as seen in FIG. 1. The other end 64 of cable 60 is anchored to the forward wall of 14 at the opposite side of the tunnel. End 62 of tunnel 60 is preferably located above the end 64 so that the cable 60 will dwell in an angular plane with respect to the horizontal so that the cables 34 and 60 may criss-cross as illustrated in FIG. 1.

It has been found that by criss-crossing two cables, the resistance in packing the feedstuff is approximately equal to four horizontal cables. Thus, the criss-crossing of the two cables makes the machine easier to use and less expensive to manufacture by having less cable and attachment requirements. The criss-crossing arrangement of the cables 34 will work satisfactorily without the use of hydraulic cylinders 26 and 30 although it is preferred that the two hydraulic cylinders be employed.

It has also been found that a single cable will perform satisfactorily if a plurality of ridges R1, R2 and R3 are placed on the inside surfaces of each of the side walls of the tunnel 14. As seen in FIG. 1, ridges R1, R2 and R3 increase in length from the rearward end of the tunnel to the forward end of the tunnel. When the density of feed becomes tight between the cable and the tunnel, the ridges R1, R2 and R3, at each side of the tunnel, act as a spur in the feed causing an increase in the density of the feed thus allowing one cable to be utilized in many conditions.

Thus, it can be seen that the instant invention provides an adjustable density control means for an agricultural feed bagging machine to enable the machine to achieve the desired density in the materials being placed in the bag regardless of the type of materials being bagged and the moisture content thereof.

Thus, it can be seen that the invention accomplishes at least all of its stated objectives.

I claim:

1. An agricultural bagging machine for bagging agricultural material into an agricultural bag having a closed end and an open mouth comprising:

a frame having rearward and forward ends;

a tunnel on said frame and having an intake end for receiving the material to be bagged and an output end adapted to receive the open mouth of the agricultural bag;

said tunnel having a top wall and opposite side walls; said top wall and said side walls having inside and outside surfaces;

a hopper on said frame forwardly of said tunnel for receiving the material to be bagged;

means at the intake end of said tunnel for forcing the material to be bagged from said hopper through said tunnel and into said bag;

and a density control means positioned between the side walls of said tunnel for engagement with the material being bagged as the material is forced past said density control means and into said bag to control the density of the material;

said density control means comprising at least a first cable positioned between the side walls of said tunnel to define a first generally U-shaped cable loop having spaced apart first and second leg portions joined by a base portion; said leg portions having forward ends positioned forwardly of said base portion;

and engagement means in engagement with said U-shaped cable loop for selectively changing the spacing between said first and second leg portions.

2. The machine of claim 1 wherein said density control means includes a second cable positioned between the opposite sides of said tunnel to define a second generally U-shaped cable loop having spaced-apart first and second leg portions joined by a base portion the planes of said first and second cable loops being angularly disposed with respect to each other.

3. The machine of claim 1 wherein the forward end of said first leg portion is positioned at a location above the forward end of said second leg portion.

4. The machine of claim 3 wherein said density control means includes a second cable positioned between said opposite side walls of said tunnel to define a second generally U-shaped cable loop having first and second leg portions joined by a base portion, the planes of said first and second cable loops being angularly disposed with respect to each other.

5. The machine of claim 1 wherein said engagement means comprises a first hydraulic cylinder in engagement with said first leg portion and a second hydraulic cylinder in engagement with said second leg portion.

6. The machine of claim 5 wherein said first and second hydraulic cylinders are elongated and are substantially horizontally disposed.

7. The machine of claim 5 wherein a control means interconnects said first and second hydraulic cylinders so that said first and second hydraulic cylinders are simultaneously extended and retracted.

8. The machine of claim 5 wherein said first hydraulic cylinder includes a base end and a rod end, said first hydraulic cylinder being substantially horizontally disposed and having its base end positioned adjacent one side wall of said tunnel adjacent the intake end thereof, said rod end of said first hydraulic cylinder being positioned inwardly of said base end of said first hydraulic cylinder and being in operative engagement with said first leg portion of said first cable loop; said second hydraulic cylinder including a base end and a rod end, said second hydraulic cylinder being substantially horizontally disposed and having its base end positioned adjacent the other side wall of said tunnel adjacent the intake end thereof said rod end of said second hydraulic cylinder being positioned inwardly of said base end of said second hydraulic cylinder and being in operative engagement with said second leg portion of said first cable loop.

9. The machine of claim 8 wherein the longitudinal axis of each of said first and second hydraulic cylinders is transversely disposed with respect to the direction of the flow of the material through said tunnel.

10. An agricultural bagging machine for bagging agricultural material into an agricultural bag having a closed end and an open mouth comprising:

a frame means having rearward and forward ends;

a tunnel on said frame means and having an intake end for receiving the material to be bagged and an output end adapted to receive the open mouth of the agricultural bag;

said tunnel having a top wall and opposite side walls;

a hopper on said frame means forwardly of said tunnel for receiving the material to be bagged;

means at the intake end of said tunnel for forcing the material to be bagged from said hopper into said tunnel and into said bag;

and a density control means positioned between the side walls of said tunnel for engagement with the material being bagged to control the density of the material as the material is forced past said density control means and into said bag;

said density control means comprising a first cable positioned between the side walls of said tunnel to define a first generally U-shaped cable loop having spaced-apart first and second leg portions joined by a base portion;

said density control means also comprising a second cable positioned between the side walls of said tunnel to define a second generally U-shaped cable loop having spaced-apart first and second leg portions joined by a base portion;

said first and second cable loops being arranged in an overlapping relationship to one another.

11. The machine of claim 10 wherein each of said first and second cable loops are angularly disposed with respect to the horizontal.

12. An agricultural bagging machine for bagging agricultural material into an agricultural bag having a closed end and an open mouth comprising:

a frame means having rearward and forward ends;

a tunnel on said frame means and having an intake end for receiving the material to be bagged and an output end adapted to receive the open mouth of the agricultural bag;

said tunnel having a top wall and opposite side walls;

said top wall and said side walls having inside and outside surfaces;

a hopper on said frame means forwardly of said tunnel for receiving the material to be bagged;

means at the intake end of said tunnel for forcing the material to be bagged from said hopper into said tunnel and into said bag;

and a density control means positioned between the side walls of said tunnel for engagement with the material being bagged to control the density of the material as the material is forced past said density control means and into said bag;

and said density control means comprising at least a first cable positioned between the side walls of said tunnel to define a first generally U-shaped cable loop having first and second leg portions joined by a base portion.

13. The bagging machine of claim 12 wherein a plurality of spaced-apart and elongated ridges are provided on the inside surface of each of said tunnel side walls, said ridges having upper and lower ends, said ridges having their lower ends positioned forwardly of their upper ends.

14. The bagging machine of claim 13 wherein the ridges on each of said tunnel side walls have varying lengths.

15. The bagging machine of claim 12 further including means on the inside surfaces of both of said tunnel side walls for creating turbulence in the flow of material passing through said tunnel.

* * * * *